MAGNETORESISTIVE AMPLIFIER

Filed Oct. 29, 1964 2 Sheets-Sheet 1

INVENTORS
PAUL E. OBERG
CHARLES H. TOLMAN
BY Thomas J. Nikolai
ATTORNEY

INVENTORS
PAUL E. OBERG
CHARLES H. TOLMAN
BY Thomas J. Nikolai
ATTORNEY

United States Patent Office 3,382,448

Patented May 7, 1968

3,382,448

MAGNETORESISTIVE AMPLIFIER

Paul E. Oberg, Minneapolis, and Charles H. Tolman, Bloomington, Minn., assignors to Sperry Rand Corporation, New York, N.Y., a corporation of Delaware Filed Oct. 29, 1964, Ser. No. 407,413
5 Claims. (Cl. 330—62)

ABSTRACT OF THE DISCLOSURE

A magnetoresistive amplifier which produces amplification of an input signal by means of the magnetoresistive effect in a magnetic element. Optimum amplification is achieved by applying the input signal to a strip line which has essentially the same area as the magnetoresistive element. This strip line is positioned substantially directly over said element and is preferably positioned parallel to the easy axis of said element and at an angle of 45° with respect to the output line that is attached to said element.

The present invention relates to an amplifier and in particular to a magnetoresistance amplifier which attains voltage and power amplification of low level impedance signals by means of the magnetoresistance effect in magnetic films.

It is old and well known that the electrical resistivities of iron and nickel change when they are magnetized. See Bozorth, Ferromagnetism, Chapter 16, "Magnetism and Electrical Properties," p. 745, D. Van Nostrand Company, Inc., Princeton, N.J., Fourth Printing, 1956. This change in resistivity resulting from the application of a magnetic field to the material in question is known as "magnetoresistance" and the resistance is found to be a maximum when the angle between the resistance measurement sense line and the magnetization vector is zero and is a minimum when the angle is 90°.

The prior art is replete with patents such as 2,979,668, 2,571,915, 1,596,558 and 1,810,539 which use the magnetoresistive effects in an amplifier. However, it will be noted that extremely large magnetic fields in the range of 15,000 gauss must be used in order for these devices to operate. Such magnetic field strengths can be obtained only with practical size magnets weighing several pounds or by an electromagnet requiring extremely large currents to produce the desired fields. Further, the size of the apparatus and the large number of turns of wire required if small currents were to be used is prohibitive in terms of space and power requirements.

Recently the magnetoresistive effect was extended to magnetic thin films being used as a memory device. See copending application Ser. No. 361,364, filed Apr. 21, 1964 by Tolman et al. and assigned to the assignee of the instant invention. A thin film is generally defined as a ferromagnetic element having single domain properties. The term "single domain property" may be considered the characteristic of a a three-dimensional element of magnetic material having a thin dimension which is substantially less than the width and length thereof wherein no domain walls can exist parallel to the surface of the element.

The present invention extends the use of the magnetoresistive effect to magnetic thin films being used as amplifiers which have advantages of high amplification of low level signals together with a low noise level. Other advantages are ease of fabrication, reliability of operation and a large operating frequency range from D.C. to nanosecond response. Further it is possible to choose a wide range of operating characteristics such as input and output impedance levels. Also, since the film element is very small and very thin, only a small input current is required to produce a large output signal depending upon the construction of the input strip line.

Thus it is an object of this invention to provide a thin film amplifier using the magnetoresistance effect.

It is a further object of this invention to provide a magnetoresistance amplifier which requires a small input current to achieve large output signals with little noise depending upon the construction of the thin film and the input strip line.

It is also an object of this invention to disclose a magnetoresistance amplifier which has a wide range of operating characteristics such as input and output impedance levels.

It is still another object of this invention to disclose a magnetoresistance amplifier having a large operating frequency range from D.C. to nanosecond response.

It is yet another object of this invention to provide a magnetoresistance amplifier which is of extremely small size when compared to conventional magnetoresistance amplifiers, is simple to fabricate and has reliability of operation.

These and other more detailed and specific objects will be disclosed in the course of the following specification, reference being had to the accompanying drawings, in which.

The prior art magnetoresistive amplifiers are generally of two types as exemplified by Patents 2,571,915 and 1,596,558.

The first type connects the small signal to be amplified directly to the magnetoresistive element as well as separately produced magnetic field of strengths in the order of 15,000 gauss and of a frequency value which is large compared to the frequency of the signal to be amplified. The potential drop across the control element varies in accordance with the directly connected input signal and simultaneously is caused to vary about some median value by the application thereto of the large, rapidly varying magnetic field. The net voltage drop across the magnetoresistive element, therefore, will in effect constitute a rapidly pulsating potential upon which is superimposed the direct current or small, slowly varying signal to be amplified. The composite voltage thus obtained is then amplified in any conventional A.C. amplifier and the amplified output is rectified to produce a direct current output which is an amplified function of the direct current or small, slowly varying signal applied to the control element.

In the second type of prior art magnetoresistive amplifier, the input signal is used to produce a large magnetic field which will change the resistance of a magnetoresistive element. However, because the input signal is so small, it must first be amplified by conventional means and then applied to a coil of a sufficient number of turns to produce the required number of ampere-turns. This large field then magnetically influences a magnetoresistive conductor to cause its resistance to change. A current which is flowing through the magnetoresistive conductor will then vary in accordance with the amplified input signal.

The disadvantages of these two types are obvious. In both cases, extremely large magnetic fields are required. In one case this large magnetic field is produced separately from the input signal and is of a much higher frequency. In order to detect the amplified input signal, a filter and rectifier are required. In the second case, a preamplifier and a larger number of turns in the field producing coil are required to provide the necessary number of ampere-turns to produce the desired field strength.

Figures 1, 2, 4, 5, 6:
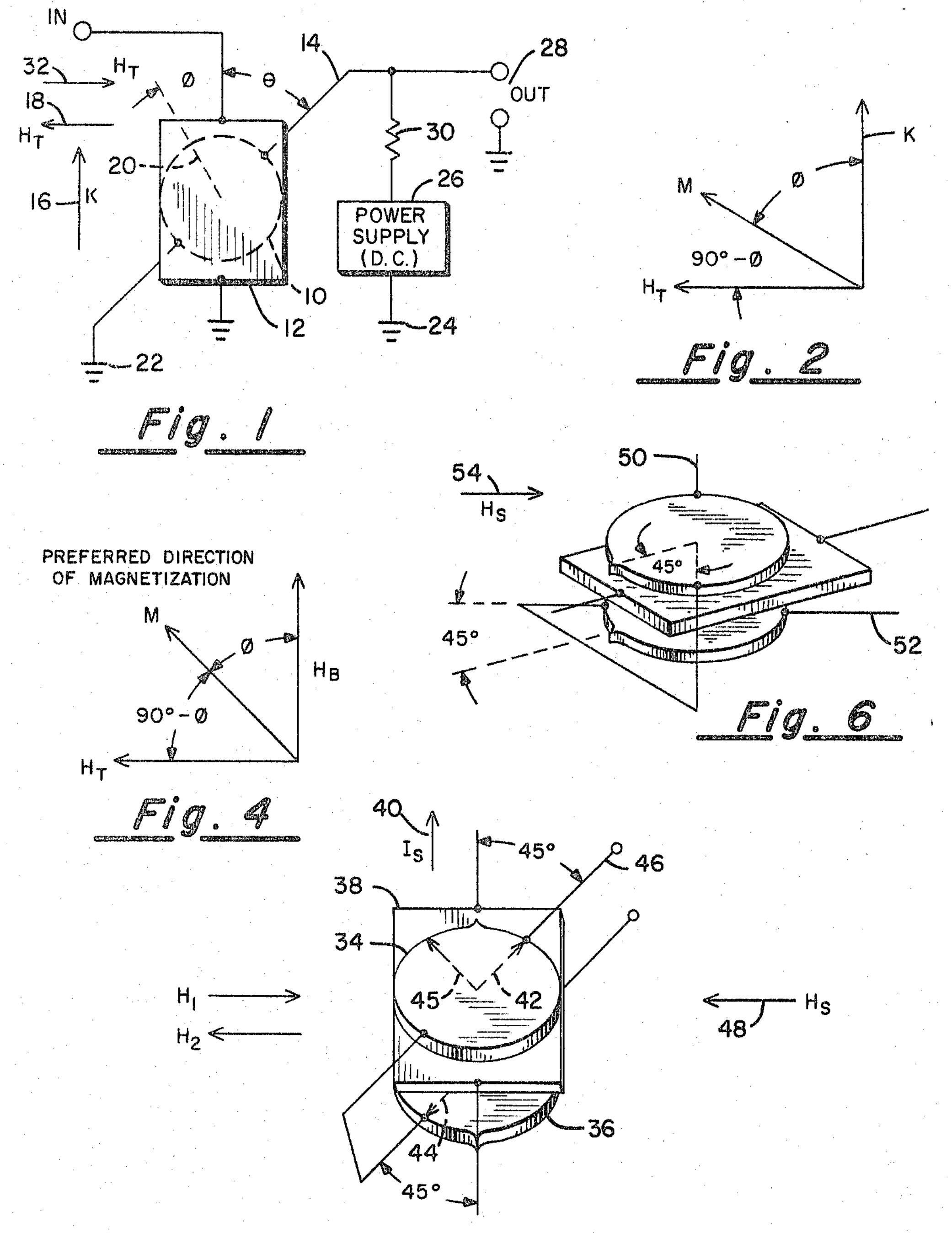
FIG. 1 is a circuit diagram of the magnetoresistance amplifier disclosed herein.
FIG. 2 is a graph showing the torques on a film magnetic vector that has been rotated.
FIG. 4 is a graph showing the torques on a zero anisotropy film.
FIG. 5 shows one embodiment of the present invention utilizing a pair of thin films, and, FIG. 6 shows another embodiment of the present invention utilizing a pair of thin films.

FIG. 1 of the present invention discloses a magnetoresistive amplifier utilizing a thin film which overcomes the above disadvantages of the prior art devices. The phenomenon of magnetoresistance in magnetic elements displaying single domain properties can be described as a rotation of the magnetization which causes a change in the electrical resistance of the material. The application of a magnetic field or the application of a stress to a magnestostrictive element will, in general cause a rotation of the magnetization. It has been established that the ohmic resistance R of a film can be expressed by the equation: (see Bozorth, supra, p. 754):

(1) $$R=(R_0-R_1)\cos^2(\theta+\phi)+R_1$$

where $R_0$ and $R_1$ are constants of the magnetic material, $R_0$ being the maximum resistance of the element and $R_1$ being the minimum resistance of the element. The angle $\theta$ is the angle between the magnetization of the film and the direction of resistance measurement and $\phi$ is the angle through which the magnetization is rotated, and which has a positive value when measured in a CCW direction from the easy axis 16 as shown in FIG. 1.

Thus, in FIG. 1, magnetic thin film 10 has physically attached to it resistance measurement sense line or output line 14. The short section of strip line 12 is magnetically coupled to the film 10. The anisotropy axis or easy axis K of film 10 along which the magnetic vector rests is in the direction shown by vector 16. The angle between the easy axis and the resistance measurement sense line or output line 14 is denoted as $\theta$.

When an input signal is applied to strip line 12, it produces a magnetic field $H_T$ which is transverse to the easy axis 16 and which is shown in FIG. 1 by either of vectors 18 or 32. Depending upon the magnitude and polarity of the input signal, the magnetic vector of the film is rotated through an angle $\phi$ either in a clockwise or a counterclockwise direction. In FIG. 1 the vector is shown to be rotated counterclockwise to the position indicated by vector 20 upon the application of transverse field 18.

In accordance with the principle of magnetoresistance, the resistance of the film will be a maximum when the magnetic vector is parallel to the resistance measurement sense line. Thus, if the angle between the film magnetic vector and the resistance measurement sense line is zero ($\theta+\phi=0°$) or, in other words, they are parallel, then it can be seen that Equation 1 reduces to (2) $$R=R_0$$

and the film resistance is a maximum. However, when the magnetic vector is rotated by the input signal such that it is perpendicular to the resistance measurement sense line, or $\theta+\phi=90°$, then Equation 1 reduces to (3) $$R=R_1$$

and the resistance is a minimum.

The resistance of film 10, external resistor 30, resistance measurement sense line 14 and power supply 26 form a series circuit through grounds 22 and 24. The voltage developed across the film 10 upon rotation of the magnetization is the output voltage which is present on output terminals 28.

A small input signal on line 12 will produce a magnetic field $H_T$ which will cause the magnetic vector of thin film 10 to rotate either clockwise or counterclockwise from its rest position depending upon the polarity of the input signal. In accordance with Equation 1 the resistance of the film will either increase or decrease from some value as determined by the rest state of the film. Since the total voltage produced by power supply 26 is dropped across the resistance of the film 10 and the external resistor 30, the voltage developed across film 10 will vary according to the variations of the input signal.

However, even though the voltage developed across the film varies according to variations of the input signal, this does not mean that amplification necessarily takes place. In fact, as will be shown later, there may be a power loss in the device. Optimum amplification or gain will take place depending upon the construction of the input strip line and the thin film. A strip line has a resistance which depends upon its length and width and thickness. Further, the entire length of a strip line produces a magnetic field when a current is passed through it, yet the only part of that field which will affect the thin film is that part due to the strip line which is positioned substantially over the thin film as shown in FIG. 1.

Therefore if the strip line is long relative to the diameter of the thin film, a considerable amount of input power may be required to develop a small output signal. On the other hand, if the strip line is reduced in length to that portion positioned substantially over the thin film, its resistance will be small, yet it will produce a field which will have the same effect on the film as a strip line of longer length. Thus, in copending application 361,364, supra, where a plurality of thin films are coupled together by a strip line to form a nondestructive readout, no practical amplification could occur even though the output voltage variations follow the input voltage variations and only one film is used. Further, the smaller and thinner the film and the smaller and thicker the strip line, the less power input is required for the same output power.

Therefore it can be seen that both power and voltage gains may be achieved by (1) increasing the direct current in the sense line, (2) decreasing the film thickness, (3) reducing film width (with length unchanged), (4) reducing length and width (with similar shape retained) and (5) reducing the anisotropy film ($H_K$) of the film. Because for most operations the film element is small and very thin, only a small input current and voltage will be required to develop a large output signal. Voltage gains of 100 and smaller power gains are obtainable. If the input signal is very small, multiple amplification stages may be used to advantage.

In FIG. 1, $\theta$ is the angle between the easy axis 16 and resistance measurement sense line 14 and $\phi$ is the angle of rotation of the film's magnetic vector upon application of the field $H_T$. Therefore, the change in film resistance upon rotation of the magnetization through the angle $\phi$ is (4) $$\Delta R=(\Delta R)_0[\cos^2(\theta+\phi)-\cos^2\theta]$$

where $\Delta R$ is the total change in film resistance as the magnetic vector rotates through the angle $\phi$ and $(\Delta R)_0$ is a constant of the magnetic film element where $$(\Delta R)_0=R_0-R_1$$

and is the maximum possible change in resistance. When the angle $\theta$ between the easy axis 16 and the resistance measurement sense line is 45°, Equation 4 becomes (5) $$\Delta R=(\Delta R)_0[\cos^2(\phi+45°)-\tfrac{1}{2}]$$

Since $\Delta R$ causes a voltage change to be produced across film 10, the output voltage is proportional to the change in film resistance as expressed by Equation 5.

The total free energy, F per unit volume of film 10 is determined by the anisotropy energy of the film, $K\sin^2\phi$, as well as the energy supplied to the film by the external field $H_T$. Thus, as can be seen in FIG. 2:

$$F=K\sin^2\phi-MH_T\cos(90^\circ-\phi) \quad (6)$$

where, as is well known, $K=\frac{1}{2}MH_K$, M is the saturization magnetization of the film in gauss and $H_T$ is the applied transverse field in oersteds. Taking the partial derivative of Equation 6 to determine when the torque on the magnetization is zero:

$$T=-\frac{\partial F}{\partial\phi}=-K\sin 2\phi+MH_T\cos\phi=0 \quad (7)$$

or $$\frac{\sin 2\phi}{\cos\phi}=\frac{MH_T}{K}=\frac{MH_T}{\frac{1}{2}MH_K}$$

and $$\sin\phi=\frac{H_T}{H_K} \quad (8)$$

where $H_K$ is the anisotropy constant of the film. Since the input voltage is proportional to the field $H_T$ and $H_T=H_K\sin\phi$, with will be seen that the input voltage is proportional to $\sin\phi$.

Figure 3:
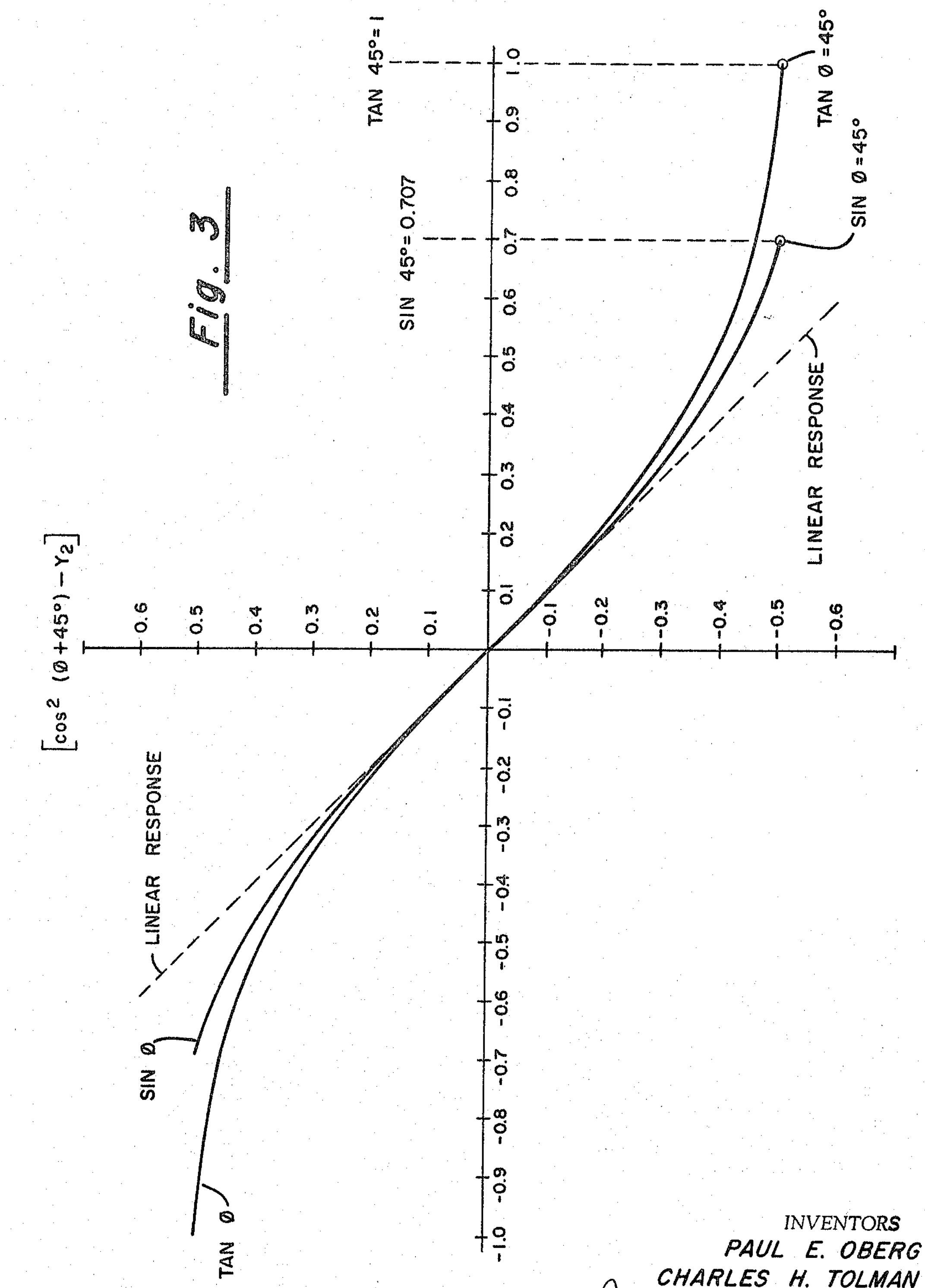
FIG. 3 is a graph showing the relationship between the input voltage and the change in film resistance which is proportional to the output voltage.

Thus, since the input voltage is proportional to $\sin\phi$ and the output voltage is proportional to the change in film resistance $[\cos^2(\phi+45^\circ)-\frac{1}{2}]$, as expressed by Equation 5, a graph of input voltage versus output voltage can be plotted. This graph will show the linearity of response or the distortion involved in the amplification process. Such a curve is shown in FIG. 3 and is indicated as the $\sin\phi$ curve. It will be noted that there is a near linear input-output relationship over a large portion of possible operation. If the operation of the amplifier is restricted to the nearly linear range as shown in FIG. 3, then the input voltage-output voltage relationship is nearly linear and the input power-output power relationship is almost linear and $$V_{out}=C\times V_{in} \quad (9)$$

and $$P_{out}=C'\times P_{in} \quad (10)$$

where C and C' are gain factors.

It is possible to use a zero anisotropy film, one that has no preferred direction of magnetization, since a bias winding may be used to provide a field which will establish a preferred direction of magnetization. If this is the case, the total free energy, F, per unit volume of film 10 is determined by the energy of the bias field as well as the energy supplied to the film by the external field $H_T$. Thus, according to FIG. 4:

$$F=-MH_B\cos\theta-MH_T\cos(90-\phi) \quad (11)$$

where M is the saturization magnetization of the film, $H_B$ is the field produced by the bias winding, $H_T$ is the applied transverse field and $\phi$ is the angle through which the magnetic vector is rotated. Taking the first derivative of Equation 11 to determine when the total torque on the magnetization is zero, we have $$T=-\frac{\partial F}{\partial\phi}=-MH_B\sin\phi+MH_T\cos\phi=0 \quad (12)$$

or $$H_B\sin\phi=H_T\cos\phi$$

and $$\tan\phi=\frac{H_T}{H_B} \quad (13)$$

Thus, the input voltage is proportional to the transverse field $H_T$ which is proportional to $\tan\phi$ as shown in Equation 13.

The linearity of the input voltage to the output voltage when using a film with zero anisotropy is also shown in FIG. 3 plotted as $\tan\phi$ which is proportional to $H_T$ versus the output voltage which is proportional to $$[\cos^2(\phi+45^\circ)-\tfrac{1}{2}]$$

As can be seen there is a reduction in the range of linearity with the use of the zero anisotropy film.

Because stray magnetic fields may adversely affect operation of a circuit of the present invention employing a single film, it may be advantageous to utilize the films in pairs as shown in FIG. 5. Films 34 and 36 which have their respective magnetizations antiparallel are shown separated by but inductively coupled to drive or strip line 38. If a current $I_s$ is passed through strip line 38 in the direction shown by vector 40, a field $H_1$ is produced in the direction shown which affects the top film while field $H_2$ is produced in the direction shown and which affects the bottom film. Thus, field $H_1$ rotates the magnetization of the top film to the position shown by vector 42 which causes an increase in the resistance of the top film to occur. Field $H_2$ rotates the magnetization of the bottom film to the position shown by vector 44 which also causes an increase in the resistance of the bottom film to occur. Therefore, the magnitude of the change of the output on line 46 will be double that of a single film. However, if a stray magnetic field $H_s$ is applied to the films as shown for illustrative purposes only by vector 48, the magnetization of the top film rotates to a position indicated by vector 45 which causes a decrease in the film resistance while the magnetization of the bottom film rotates to a position shown by vector 44 as before which causes an increase in the film resistance. Thus, the net output is zero and no net change in film resistance is realized. It can be seen then that the stray magnetic field $H_s$ causes the two magnetizations to rotate in the same direction with each cancelling the output of the other while the field from the strip line causes the two magnetizations to rotate in opposite directions thus adding the output of one film to the output of the other.

The two films may have their magnetizations parallel as shown in FIG. 6 if the films are so constructed that the demagnetizing field of one will not align the direction of magnetization of the other in an opposite or antiparallel direction. If the two films are so constructed that their magnetizations are parallel as shown in FIG. 6, the sense lines 50 and 52 must be connected to their respective films at right angles as shown. The field produced by the strip line will cause the magnetizations of the two films to rotate in opposite directions with the resistance change of one film adding to the resistance change of the other. However, if a stray magnetic field $H_s$ is applied to the films in the direction shown by vector 54, the resistance of one film will increase while the resistance of the other will correspondingly decrease thus causing no net output.

The input and output impedances of the amplifier may be varied from 0 to 1 ohm and 10 to 1000 ohms respectively depending upon the construction of the input strip line and the film. Thus if either the thickness, length or width of the strip line or the thin film is changed, the impedances change accordingly.

Further, voltage gains of 100 and lower power gains can be obtained with the present invention. In the laboratory model, the following parameters were used:

| | |
|---|---|
| Size film ----------mm-- | 8 |
| $I_{in}$ (pulse) ----------mps-- | 2.6 |
| $V_{in}$ (measured as drop in strip line above the film) ----------mv-- | 0.25 |
| $R_{in}$ ----------ohm-- | $1\times10^{-4}$ |

With a current of 34 ma. in the output line (14 in FIG. 1), the output voltage was 1.5 mv. With a current of 64 ma. in the output line, the output voltage was 2.6 mv. This gives voltage gains of 6 and 10.5 respectively and power gains of 0.08 and 0.26 respectively. Thus, there was actually a power loss in the device. The reason for this was the large size film and strip line used. Consider the results if a 50 mil film and strip line is used. The field generated by passing a current through a thin strip line is $$H=\frac{\pi I}{5w} \quad (14)$$

where H is the field generated in oersteds, I is the current through the strip line in amps and $w$ is the width of the strip line in mm. To have the same output voltages and currents as in the previous example and yet have a different size strip line and film, the two fields produced must be the same ($H_1=H_2$):

$$H_1=\frac{\pi I_1}{5w_1}=H_2=\frac{\pi I_2}{5w_2} \text{ or} \quad (15)$$

$$\frac{\pi I_1}{5w_1}=\frac{\pi I_2}{5w_2} \text{ or}$$

$$I_2=I_1\left(\frac{w_2}{w_1}\right) \quad (16)$$

In the laboratory model, the film (and thus the strip line) was 8 mm. (or 315 mils) in diameter (or strip line width) with 2.6 amperes of current. If we now reduce the strip line width to 50 mils, then $$I_2=2.6\left(\frac{50}{315}\right)=0.41 \text{ amp} \quad (17)$$

Thus, 0.41 amp in the 50 mil strip line will produce the same field (and thus the same outputs) as 2.6 amps in the 8 mm. strip line while the resistance remains the same. It should be noted at this point that the only length of the strip line which will produce a field that will affect the thin film is that which is positioned approximately directly over the film. Thus, if the film size is reduced and both the width and length of the strip line correspondingly reduced, the resistance of the strip line positioned directly over the film should remain constant.

Therefore, when changing the film (and the strip line) from 8 mm. to 50 mils while maintaining the same output parameters, the following input parameters are obtained:

$I_{in}=0.41$ amp
$R_{in}=1\times10^{-4}$ ohms
$V_{in}=0.41\times10^{-4}=0.441$ mv.

Thus, the voltage gain in the first example is the output voltage, 1.5 mv., divided by the input voltage, 0.041 mv., or 37.5 while the voltage gain in the second example is 2.6 mv./0.041 mv. or 65. The corresponding power gains are 3 and 10 respectively. Greater gains can be realized by changing appropriate parameters as previously stated.

Therefore, it can be seen that the present invention provides a magnetoresistive amplifier requiring a small input current and voltage but which provides a large output signal. It has a variable range of input and output impedances, large voltage gains and linear operating characteristics. It is also easy to fabricate, has a low noise level, has reliability of operation and a large operating frequency range.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. A magnetoresistive amplifier comprising:
a magnetoresistive element having an easy axis of magnetization,
means for passing a current through said element,
input signal means for producing a magnetic field at an angle to said easy axis,
said input signal means including a strip line of essentially the same area as said element and positioned substantially directly over said element,
said magnetic field causing a potential change across said element, and
means directly responsive to the potential change across said element.

2. A magnetoresistive amplifier comprising:
a magnetoresistive element whose resistivity varies in accordance with the strength of an applied magnetic field and which has an easy axis of magnetization,
an output signal line connected to said element,
drive line means inductively coupled to said element,
said drive line including a strip line of essentially the same area as said element and positioned substantially directly over said element,
input signal means connected to said drive line to produce a magnetic field at an angle to said easy axis the magnitude of which is proportional to the variations of the input signal, and
means coupled to said output signal line for detecting a voltage drop across said element having a near linear relationship to said input voltage.

3. A magnetoresistive amplifier comprising:
a magnetic thin film having a rotatable magnetic vector and an easy axis,
an output line connected to said film at an angle with said easy axis,
a strip line of substantially the same area as said film inductively coupled to said film and aligned with said easy axis,
means for causing voltage variations across said film, said means including an input signal coupled to said strip line for producing a magnetic field, said magnetic field causing said vector to rotate, and
means connected to said output line responsive to said voltage variations.

4. The amplifier of claim 3 wherein:
said angle between the output line and said easy axis is 45°.

5. A magnetoresistive amplifier comprising:
a magnetic thin film having a rotatable magnetic vector and an easy axis,
an output line connected to said film at an angle with said easy axis and
input signal means coupled to said film through a strip line of substantially the same area as said film for causing said magnetic vector to rotate and produce voltage variations across said film.

References Cited

UNITED STATES PATENTS 3,070,783 12/1962 Pohm.

ROY LAKE, *Primary Examiner.*

NATHAN KAUFMAN, *Examiner.*